United States Patent [19]

Imada

[11] Patent Number: 5,526,096
[45] Date of Patent: Jun. 11, 1996

[54] IMAGE-FORMING APPARATUS WITH AN AREA-SELECTING FUNCTION WHICH SELECTS AN AREA IN A SURFACE-UP CONDITION OF AN ORIGINAL AND WHICH FORMS AN IMAGE ON THE BASIS OF THE SELECTED AREA OF THE ORIGINAL PLACED IN A SURFACE-DOWN CONDITION

[75] Inventor: Norio Imada, Tokyo, Japan

[73] Assignee: Kabushiki Kaisha Toshiba, Kawasaki, Japan

[21] Appl. No.: 318,543

[22] Filed: Oct. 5, 1994

[30] Foreign Application Priority Data

Dec. 13, 1993 [JP] Japan ..................................... 5-311731

[51] Int. Cl.⁶ ................................................. G03G 21/00
[52] U.S. Cl. ........................... 355/218; 355/208; 355/210
[58] Field of Search ..................................... 355/202, 206, 355/208, 209, 210, 218, 244, 77; 358/450, 452

[56] References Cited

U.S. PATENT DOCUMENTS

| | | | |
|---|---|---|---|
| 4,653,899 | 3/1987 | Watanabe | 355/218 |
| 4,887,129 | 12/1989 | Shenoy et al. | 355/218 |
| 5,134,437 | 7/1992 | Maruta et al. | 355/202 |
| 5,138,384 | 8/1992 | Mizutani et al. | 355/218 |
| 5,146,275 | 9/1992 | Tone et al. | 355/244 |
| 5,172,167 | 12/1992 | Ito | 355/218 |
| 5,283,666 | 2/1994 | Otani | 358/452 X |
| 5,331,376 | 7/1994 | Acquaviva | 355/202 |

FOREIGN PATENT DOCUMENTS 61-141467  6/1986  Japan .

Primary Examiner—Sandra L. Brase
Attorney, Agent, or Firm—Foley & Lardner

[57] ABSTRACT

An image-forming apparatus for forming an image on an image-bearing member on the basis of an original image, including: a platen on which an original having an original image is placed, the platen having a reference portion; an input device for inputting coordinates representing a predetermined area of the original placed in a surface-up condition on the reference portion; and a control unit for performing coordinate transformation from the coordinates to transformed coordinates. The transformed coordinates represent the predetermined area of an original placed in a surface-down condition. The image-forming apparatus includes an image-scanning unit. The image-scanning unit has an electric component which scans an original placed in the surface-down condition on the reference portion. The image-forming apparatus further includes an image-forming unit. The image-forming unit has an electric component which forms an image on an image-bearing member on the basis of the original image which the image-scanning unit scanned, and which is limited to the predetermined area represented by the transformed coordinates.

13 Claims, 13 Drawing Sheets

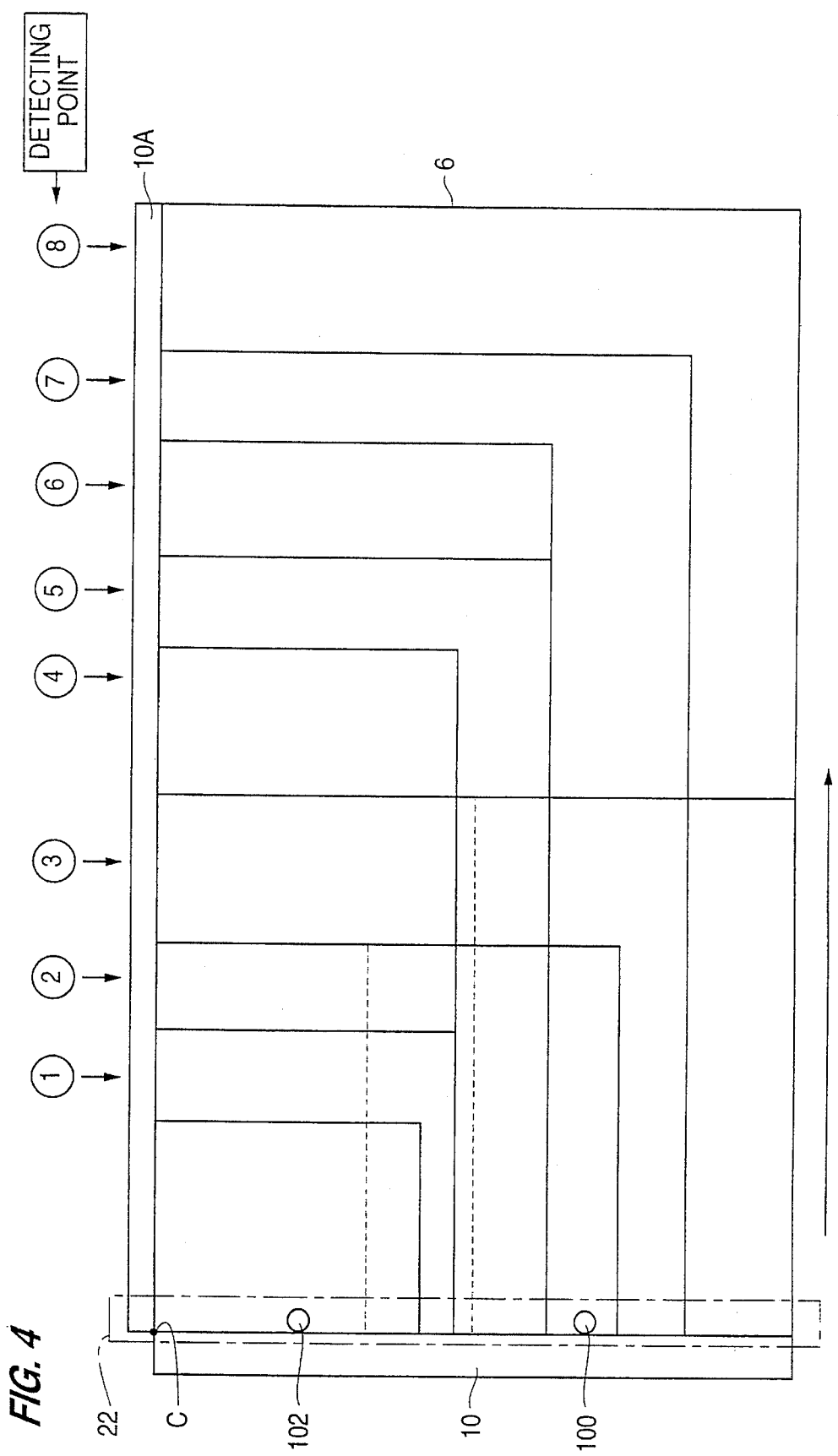

FIG. 5

| DETECTING POINT | ① | | ② | | ③ | | ④ | | ⑤ | | ⑥ | | ⑦ | | ⑧ | | W (MM) |
|---|---|---|---|---|---|---|---|---|---|---|---|---|---|---|---|---|---|
| LENGTH FROM FIXED SCALE 10 (MM) | 132.4 | | 162.0 | | 200.0 | | 233.0 | | 274.75 | | 313.5 | | 350.0 | | 386.5 | | |
| SENSOR | 102 | 100 | 102 | 100 | 102 | 100 | 102 | 100 | 102 | 100 | 102 | 100 | 102 | 100 | 102 | 100 | |
| A3 - LENGTHWISE | O | O | O | O | O | O | O | O | O | O | O | O | O | O | O | O | 297 |
| B4 - LENGTHWISE | O | O | O | O | O | O | O | O | O | O | O | O | O | O | X | X | 257 |
| FOLIO | O | O | O | O | O | O | O | O | O | X | O | O | X | X | X | X | 210 |
| A4 - LENGTHWISE | O | O | O | O | O | O | O | O | O | X | X | X | X | X | X | X | 210 |
| B5 - LENGTHWISE | O | O | O | O | O | O | O | X | X | X | X | X | X | X | X | X | 182 |
| A4 - CROSSWISE | O | O | O | O | O | O | X | X | X | X | X | X | X | X | X | X | 297 |
| B5 - CROSSWISE | O | O | O | O | O | X | X | X | X | X | X | X | X | X | X | X | 257 |
| A5 - LENGTHWISE | O | O | O | X | X | X | X | X | X | X | X | X | X | X | X | X | 148 |
| A5 - CROSSWISE | O | O | O | O | X | X | X | X | X | X | X | X | X | X | X | X | 210 |
| B6 - LENGTHWISE | O | O | O | X | X | X | X | X | X | X | X | X | X | X | X | X | 128 |
| B6 - CROSSWISE | X | X | X | X | X | X | X | X | X | X | X | X | X | X | X | X | 182 |

FIG. 11

| DETECTING POINT | ① | | ② | | ③ | | ④ | | ⑤ | | ⑥ | | ⑦ | | ⑧ | | L (MM) |
|---|---|---|---|---|---|---|---|---|---|---|---|---|---|---|---|---|---|
| LENGTH FROM FIXED SCALE 10 (MM) | 132.4 | | 162.0 | | 200.0 | | 233.0 | | 274.75 | | 313.5 | | 350.0 | | 386.5 | | |
| SENSOR | 102 | 100 | 102 | 100 | 102 | 100 | 102 | 100 | 102 | 100 | 102 | 100 | 102 | 100 | 102 | 100 | |
| A3 - LENGTHWISE | O | O | O | O | O | O | O | O | O | O | O | O | O | O | O | O | 420 |
| B4 - LENGTHWISE | O | O | O | O | O | O | O | O | O | O | O | O | O | O | X | X | 364 |
| FOLIO | X | O | X | O | O | O | O | O | O | O | O | O | X | X | X | X | 330 |
| A4 - LENGTHWISE | X | X | X | O | O | O | O | O | O | O | O | O | X | X | X | X | 297 |
| B5 - LENGTHWISE | X | X | X | O | O | O | O | O | O | O | X | X | X | X | X | X | 257 |
| A4 - CROSSWISE | O | O | O | O | O | X | O | X | O | X | X | X | X | X | X | X | 210 |
| B5 - CROSSWISE | O | O | O | O | X | O | X | X | X | X | X | X | X | X | X | X | 182 |
| A5 - LENGTHWISE | O | O | X | X | X | X | X | X | X | X | X | X | X | X | X | X | 210 |
| A5 - CROSSWISE | O | O | O | X | X | X | X | X | X | X | X | X | X | X | X | X | 148 |
| B6 - LENGTHWISE | O | O | X | O | X | X | X | X | X | X | X | X | X | X | X | X | 182 |
| B6 - CROSSWISE | X | X | X | X | X | X | X | X | X | X | X | X | X | X | X | X | 128 |

IMAGE-FORMING APPARATUS WITH AN AREA-SELECTING FUNCTION WHICH SELECTS AN AREA IN A SURFACE-UP CONDITION OF AN ORIGINAL AND WHICH FORMS AN IMAGE ON THE BASIS OF THE SELECTED AREA OF THE ORIGINAL PLACED IN A SURFACE-DOWN CONDITION

BACKGROUND OF THE INVENTION

1. Field of the Invention

The present invention relates to an image-forming apparatus for forming an image on an image-bearing member on the basis of an original image of an original placed in a surface-down condition on an image-reading section. More specifically, the invention relates to an image forming apparatus Which has an area-selecting function for selecting an area in an original image of an original placed in the surface-up condition on the image-reading section.

2. Description of the Related Art

Recently, many image-forming devices, e.g., plain paper copying machines, have an area-selecting function, as disclosed in U.S. Pat. No. 4,653,899.

The area-selecting function is useful for operators to pick up only a desired image in a whole original image.

An operator, however, has to input coordinates representing the desired image area while an original is placed on a right side of a platen and the original surface is up. After that, the operator reverses the original so that the, original surface is down, and places it on the left side of the platen. In this way, the input coordinates may be transformed to a predetermined coordinate which represents the desired area in the reversed original irrespective of the size of the original. Thus, because an operator has to change the position at which an original is placed from the right side to left side, this function is not convenient for an operator.

SUMMARY OF THE INVENTION

It is therefore an object of the present invention to provide an improved image-forming apparatus.

It is the particular object of the present invention to provide an image-forming apparatus with an area-selecting function which is convenient for an operator.

It is a further object of the present invention to provide an improved image-forming method.

In accordance with one aspect of the present invention, the foregoing objects are achieved by providing an image-forming apparatus for forming an image-bearing member on the basis of an original image, comprising: a platen on which an original having an original image is placed, the platen having a reference portion; means for inputting coordinates representing a predetermined area of the original placed in a surface-up condition on the reference portion; and means for performing coordinate transformation from the coordinates to transformed coordinates. The transformed coordinates represent the predetermined area of an original placed in a surface-down condition. The image-forming apparatus includes an image-scanning unit. The image-scanning unit has an electric component which scans an original placed in the surface-down condition on the reference portion. The image-forming apparatus further includes an image-forming unit. The image-forming unit has an electric component which forms an image on an image-bearing member on the basis of the original image which the image-scanning unit scanned, and which is limited to the predetermined area represented by the transformed coordinates.

In accordance with another aspect of the present invention, there has been provided an image-forming apparatus for forming an image on an image-bearing member on the basis of an original image, comprising: a platen on which an original is placed, the platen having a reference portion; a first fixing scale arranged along a first edge of the platen; and a second fixing scale arranged along a second edge of the platen so that the first edge and the second edge form a corner having substantially a right angle. The first fixing scale and the second fixing scale are marked out in equal increments and position an original at the reference portion. The image-forming apparatus further includes means for setting a partial image-forming mode; and means for inputting coordinates representing a predetermined area of the original which is placed on the reference portion and whose image surface is up, in the partial image-forming mode. The coordinates being determined on the basis of the marks of the first fixing scale and the second fixing scale. The image-forming apparatus also includes means for displaying a message which shows how to reverse the original after the coordinates have been input so that an operator can reverse the original properly; means for performing coordinate transformation from the coordinates to transformed coordinates, the coordinates and the transformed coordinates being symmetric with respect to an axis around which the original is rotated when an operator reverses the original; a key which an operator operates to make an image-forming operation start; means for scanning an original image on the reference portion when the key is operated; and means for forming an image on an image-bearing member on the basis of the original image which the image-scanning unit scanned, and which is limited to the predetermined area represented by the transformed coordinates.

In accordance with still another aspect of the present invention, there has been provided an image-forming method, comprising the steps of: inputting coordinates representing a predetermined area of an original placed in a surface-up condition on an image-scanning portion performing coordinate transformation from the coordinators to transformed coordinates, the transformed coordinates representing the predetermined area of an original placed in a surface-down condition; scanning the original placed in the surface-down condition on the image-scanning portion; and forming an image on an image-bearing member on the basis of the original image which is scanned, and which is limited to the predetermined area represented by the transformed coordinates.

BRIEF DESCRIPTION OF THE DRAWINGS

A more complete appreciation of the present invention and many of the attendant advantages thereof will be readily obtained as the intention becomes better understood by reference to the following detailed description, when considered in connection with the accompanying drawings, wherein:

FIG. 4 is a plan view of the platen of the copying machine for showing how to detect a size of an original placed thereon;

FIG. 5 is a table for showing how to determine a size of an original and a width of an original on the basis of the output by sensors 100 and 102;

FIG. 1, FIGS. 8(a) and 8(b) are flow charts for illustrating the operation of the control system shown in FIG. 7;

FIG. 11 is a table for showing how to determine a size of an original and a length of an original of the copying machine of the second embodiment, on the basis of the output by sensors 100 and 102.

DETAILED DESCRIPTION OF THE PREFERRED EMBODIMENTS

Figure 1:
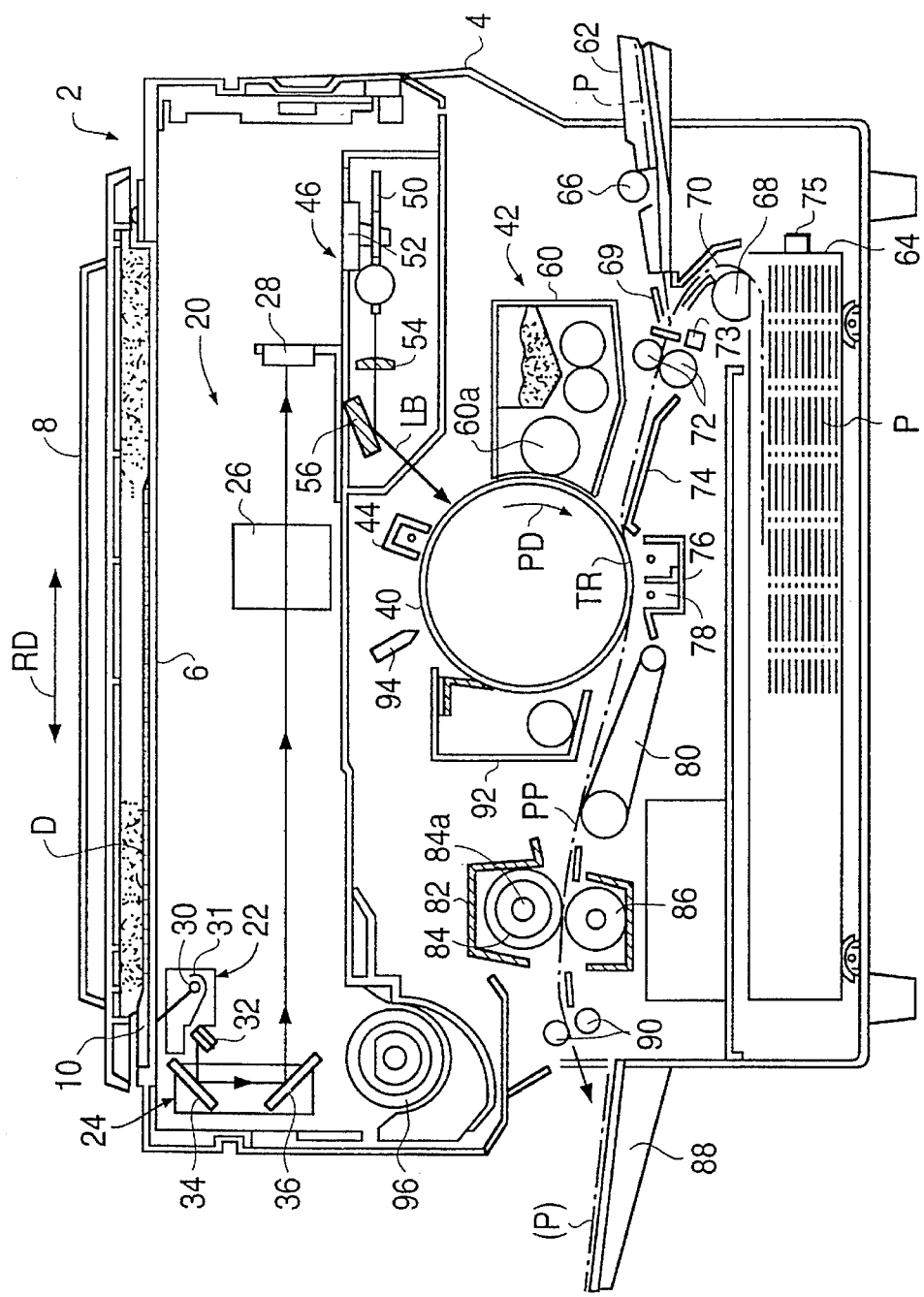
FIG. 1 is a sectional view showing the arrangement of a copying machine of a first embodiment of the present invention.
Figure 2:
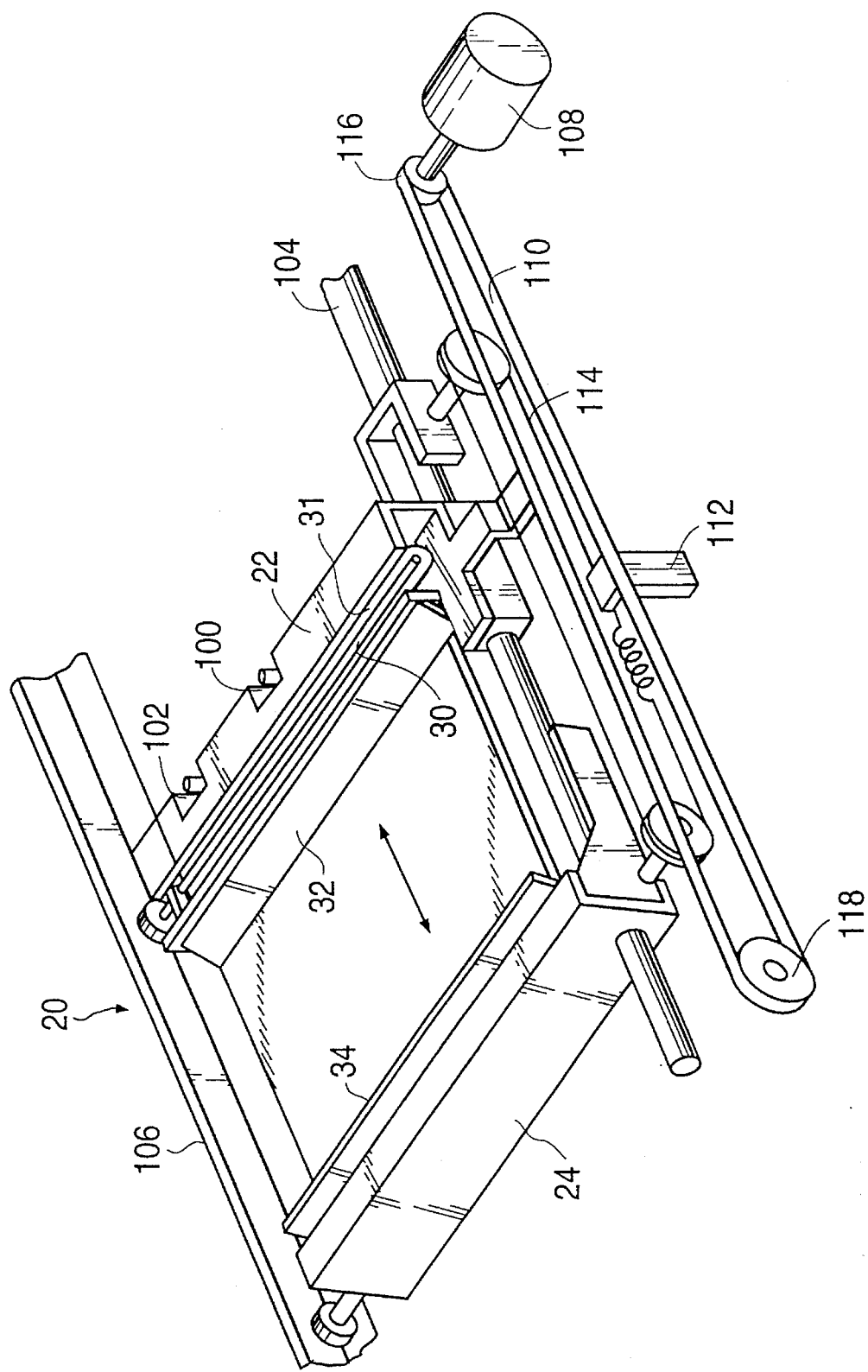
FIG. 2 is a perspective view schematically showing a construction of ah image-reading system of the copying machine shown in FIG. 1.

FIG. 1 shows a copying machine 2 as an image-forming apparatus according to a first embodiment of the present invention. Copying machine 2 includes a copying machine housing 4. A platen 6 which is a transparent glass is fixed on the upper surface of housing 4. A platen cover 8 is arranged to removably cover platen 6. A fixed scale 10 for indicating placement positions for positioning an original D is arranged at one end of platen 6 as described later.

Original D placed on platen 6 is scanned for image exposure by an image-reading system 20. Image-reading section 20 acts as a means for scanning an original image. Image-reading system 20 includes a first carriage 22, a second carriage 24, and a lens block 26 for focusing the light from original D either unmagnified, magnified or reduced on to a CCD sensor 28. First carriage 22 includes an exposure lamp 30, a reflector 31 for reflecting the light from exposure lamp 30 to platen 6, a mirror 32 and an original detector for detecting original D described later. Second carriage 24 includes a mirror 34 and a mirror 36. First carriage 22 and second carriage 24 are moved by a pulse motor (not shown), through a driving belt and some gears (not shown). Therefore, when image-reading system 20 scans original D, original D is exposed by exposure lamp 30 while first carriage 22 and second carriage 24 reciprocate in the direction indicated by an arrow RD along the under surface of platen 6. In this case, second carriage 24 moves at a speed half that of first carriage 22 in order to maintain a fixed optical path length.

A reflected light beam from original D scanned by image-reading system 20 is reflected by mirror 32, mirror 34 and mirror 36, transmitted through lens block 26 and then directed to CCD sensor 28. CCD sensor 28 outputs electric signals Corresponding to the reflected light beam indicating the original image of original D.

A photosensitive drum 40 is surrounded by an image-forming unit 42. image-forming unit 42 acts a means for forming an image on an image-bearing member on the basis of the original image which the image-scanning unit scanned. Photosensitive drum 40 is rotated by a motor (not shown) in the direction indicated by an arrow PD so that its surface is wholly charged by a main charger 44. Therefore, the potential of the circumferential surface of photosensitive drum 40 is about −750 V. A laser beam LB is projected on the charged surface of photosensitive drum 40 by a laser unit 46, forming the electrostatic latent image. Laser unit 46 includes a semiconductor laser oscillator (not shown) for generating laser beam LB modulated in accordance with dot image data on the basis of the electronic signal output from CCD sensor 28. Also, laser unit 46 includes a collimator lens (not shown) for focussing laser beam LB emitted from the laser oscillator so that a cross-sectional shape of the laser beam LB is circular, a polygon mirror 50 for scanning laser beam LB focussed by the collimator lens, a mirror motor 52 for rotating polygon mirror 50 at a high speed, and f0 lens 54 to unify the focussing condition of the laser beam from the polygon mirror 50 in the scanning direction, and a mirror 56 for reflecting laser beam LB so that laser beam LB is radiated onto photosensitive drum 40.

The electrostatic: latent image is developed into a visible image which is a toner image by a developing roller 60a of a developing unit 60 using two component developing agents. A bias voltage of developing unit 60 is about −500 V. Paper sheets P as an image record media are delivered one by one from a paper tray 62 or a paper cassette 64 by paper-supply roller 66 or paper-supply roller 68, respectively, and guided along a paper guide path 69 or a paper guide path 70, respectively, to an aligning roller pair 72. Paper sheet P is detected by an aligning switch 73 directly upstream of aligning roller pair 72 in the transportation direction of paper sheet P. Then, each paper sheet P is delivered to a transfer region TR by aligning roller pair 72 and a guide 74, timed to the formation of the visible image on photosensitive drum 40.

Paper cassette 64 is removably attached to the bottom portion of housing 4. Paper cassette 64 and paper tray 62 can be alternatively selected by the operator using a control panel described later. Paper cassette 64 is provided with cassette size detecting switches 75 (only one shown) which detect the size of paper sheet P contained in paper cassette 64. Detecting switches 75 are each formed by a plurality of microswitches which are turned on or off in response to insertion of cassettes which have different sizes of paper sheet P.

Paper sheet P delivered to transfer region TR comes into intimate contact with the surface of photosensitive drum 40, in the space between a transfer charger 76 which is a DC corona discharger and photosensitive drum 40. As a result, the toner image on photosensitive drum 40 is transferred to paper sheet P by the agency of transfer charger 76. After the transfer, paper sheet P is separated from photosensitive drum 40 by a separation charger 78 which is a vibratory (AC and DC) corona discharger and transported by a conveyor belt 80. Separation charger 78 removes the electrostatic force supplied between photosensitive drum 40 and paper sheet P in order to separate the paper sheet from photosensitive drum 40. Thereafter, paper sheet P is delivered to a fixing unit 82 arranged at the terminal end portion of conveyor belt 80 along a paper path PP. Fixing unit 82 includes a heat roller 84 which has a heater lamp 84a and a pressure roller 86 which is arranged in contact with heat roller 84. As paper sheet P passes a nip portion between heat roller 84 and pressure roller 86, the transferred image is fixed on paper sheet P. After the fixation, paper sheet P is discharged into a tray 88 outside housing 4 by exit roller pair 90.

After the transfer, moreover, the residual toner on the surface of photosensitive drum 40 is removed by a cleaner 92. Thereafter, a residual latent image on photosensitive drum 40 is erased by a discharge lamp 94 to restore the initial state. A cooling fan 96 for preventing the temperature inside housing 4 from rising is arranged at an upper-left portion of fixed unit 82.

The construction of the image-reading system including the original detector will now be described in detail.

First carriage 22 includes a first sensor 100 and a second sensor 102. First sensor 100 detects the size of original D when copying machine 2 is in any of several modes which need to detect the size of original D. Second sensor 102 detects that original D is placed on platen 6 which is an image-reading portion. Second sensor 102 also detects the size of original D with first sensor 100 when copying machine 2 is in a mode which needs to detect the size of original D. Second sensor 102 is arranged at one end portion of first carriage 22 corresponding to the reference edge of original table 6. According to copying machine 2, the placement and the size of original D are detected, with original cover 8 unfolded. Therefore, each of first sensor 100 and second sensor 102 is made by a light modulation type reflection sensor, which includes a light-emitting element for emitting pulse-modulated light and a light-receiving element which receives only the pulse-modulated light emitted from the light-emitting element.

First carriage 32 and second carriage 24 are moveable along a guide shaft 104 and a guide rail 106. First carriage 22 and second carriage 24 are driven by a scanning motor 108 made by a pulse motor. By means of the mechanism including a driving belt 110, a wire-fixing portion 112, and a wire 114, first carriage 22 and second carriage 24 are moved backward and forward. Driving belt 110 is stretched between, and wound around a first pulley 116 and a second pulley 118.

Figure 3A:
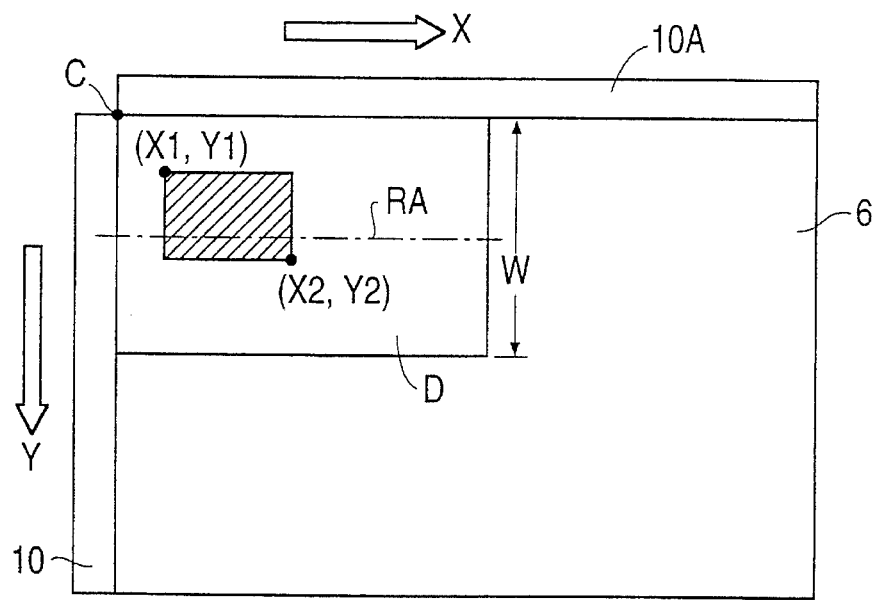
FIGS. 3(a) and 3(b) are plan views of a platen of the copying machine for showing input coordinates which represent a desired image area, and showing how to reverse an original.
Figure 3B:
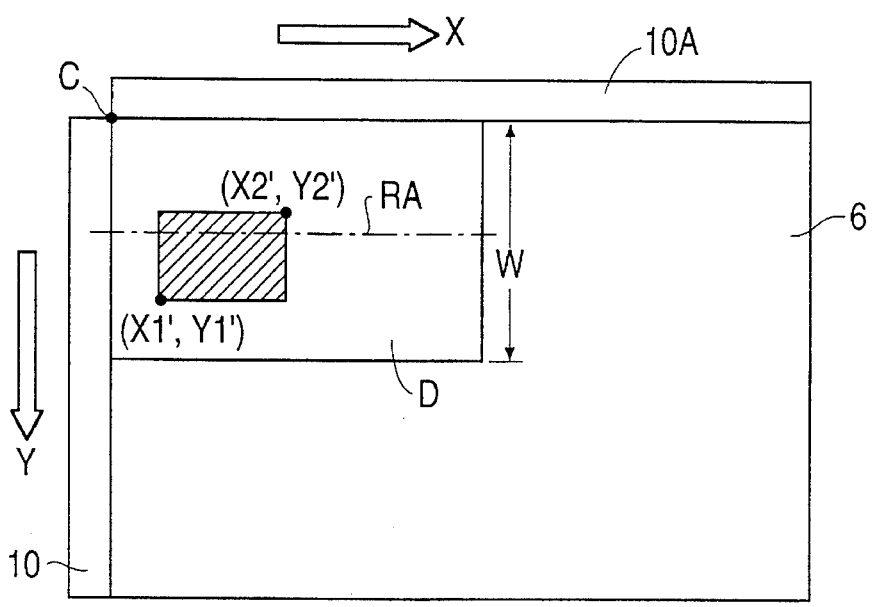

As shown in FIGS. 3(a) and 3(b), an original D is positioned at one corner C of platen 6. Fixed scale 10 is arranged along the vertical end of platen 6, and one end of fixed scale 10 corresponds to corner C. A fixed scale 10A is arranged along the horizontal end of platen, and one end of fixed scale 10A corresponds to corner C. Fixed scales 10 and 10A are marked out in equal increments so that corner C is the origin, fixed scale 10A is an X-axis, and fixed scale 10 is a Y-axis. The marks are used in a partial copying mode so as to input two coordinates P1 (X1 Y1) and P2 (X2, Y2) which form a partial copying area, as described later. In this case, the width of original b in the Y direction is W.

When copying machine 2 is in a stand-by state, first carriage 22 is positioned at one end of platen 6, as shown in FIGS. 1 and 4, so that second sensor 102 corresponds to the edge of platen 6 which is the closest to fixed scale 10. When an original D is placed on platen 6 so that two sides of original D are positioned by fixed scales 10 and 10A, respectively, second sensor 102 detects the presence of original D on platen 6. At that time, if copying machine 2 is in some modes, including the partial copying mode, which need to detect the size of original D, first carriage is moved forward. The outputs of first sensor 100 and second sensor 102 on the basis of the light received by the light-receiving elements are checked at a detecting point D to a detecting point 8 as shown in FIG. 4. The size of original D is determined in accordance with a determining manner as shown in FIG. 15. As a result, the length W is determined corresponding to the size of original D.

Figure 6:
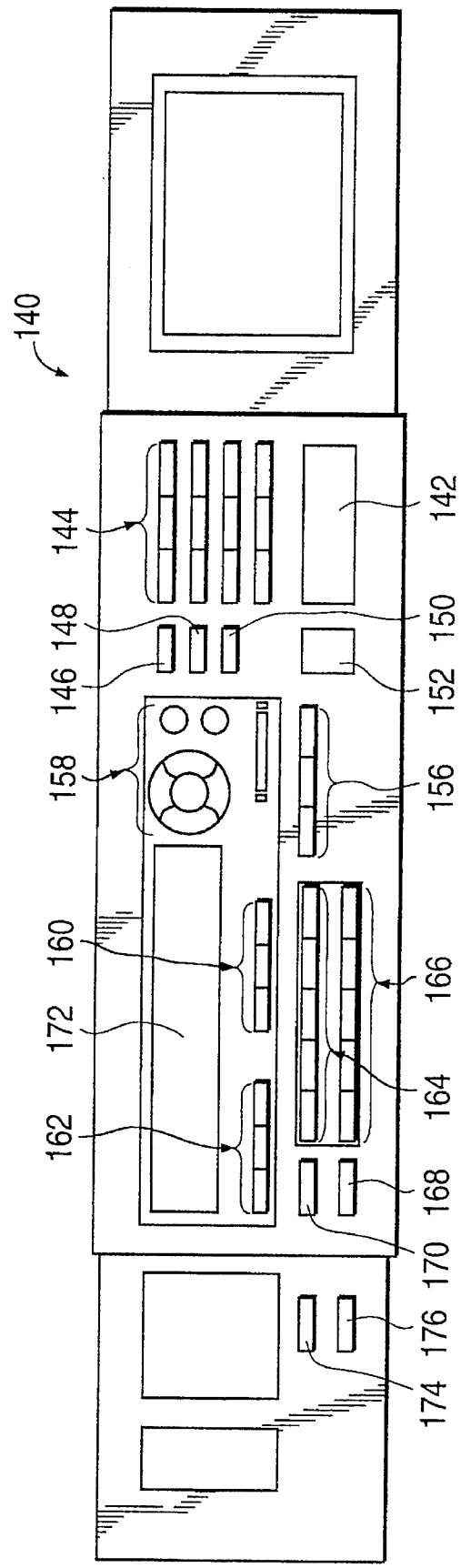
FIG. 6 is a plan view of a control panel of the copying machine shown in FIG. 1.

As mentioned above, it is possible to set a plurality of modes in copying machine 2. Also, copying machine 2 permits an operator to change the copying status from a standard status to a voluntary status. The setting and the changing are performed by operation of control panel 140 as shown in FIG. 6.

Control panel 140 Is mounted on housing 4. Control panel 140 carries thereon a copy key 142 for starting the copying operation, keys 144 for setting the number of copies to be made and the like, a function clear key 146 for setting the standard status, an energy saver key 148 for going into the energy-saving mode and turning all its display lamps off, an interrupt key 150 for making a copy of a different original during a multicopy run, and a clear/stop key 152 for Clearing the copy quantity entered or stopping a multicopy run. Control panel 140 is further provided with a density setting section 156 for setting the copy density, and editing keys 158. Copying machine 2 forms a reflected image, an inclined image, an edge emphasized image, a shadow-added image, an outline image and so on in accordance with an operation of editing keys 158.

Furthermore, copying machine 2 is provided with operation guide keys 160 including "YES" key, "NO" key, and "HELP" key, for asking the appropriate operation procedure and answering the questions from copying machine 2, zoom keys 162 for adjustably setting the enlargement or reduction ratio, an original size key 164 for setting an original size, a copy size key 166 for selecting the paper sheet size, an automatic paper selection key 168 for automatically detecting the size of the original set on original table 6 and selecting a paper sheet of the same size as the original, an automatic magnification selection key 170 for automatically detecting the size of the original D set on original table 6 and calculating the correct reproduction or enlargement ratio, a display section 172 for indicating the operating conditions of the individual parts, and a partial copying mode setting keys 174 and 176. Display section 172 acts as a means for displaying a message, as described later. When partial copying mode setting key is depressed, copying machine 2 is set in a trimming mode to make a trimming image. On the other hand, when partial copying mode setting key 176 is depressed, copying machine 2 is set in a masking mode to make a masking image. In the meantime, it is possible to replace control panel 140 with a CRT display having a so-called touch-sensor panel. Keys 144 are used as a means for inputting coordinates representing a predetermined area of the original D, as described later. Partial copying mode setting key 176 is used as a means for setting a partial image forming mode. Density setting section 156, editing keys 158, and zoom keys 162 are used as a means for changing an image-forming condition for the original image. Especially, editing key 158 is used as a means for modifying characters.

Copying machine 2 performs the copying operation on the basis of the copying status and the copying mode set by the operation or control panel 140. The copying operation is controlled by a control system 200 which will be described.

Figure 7:
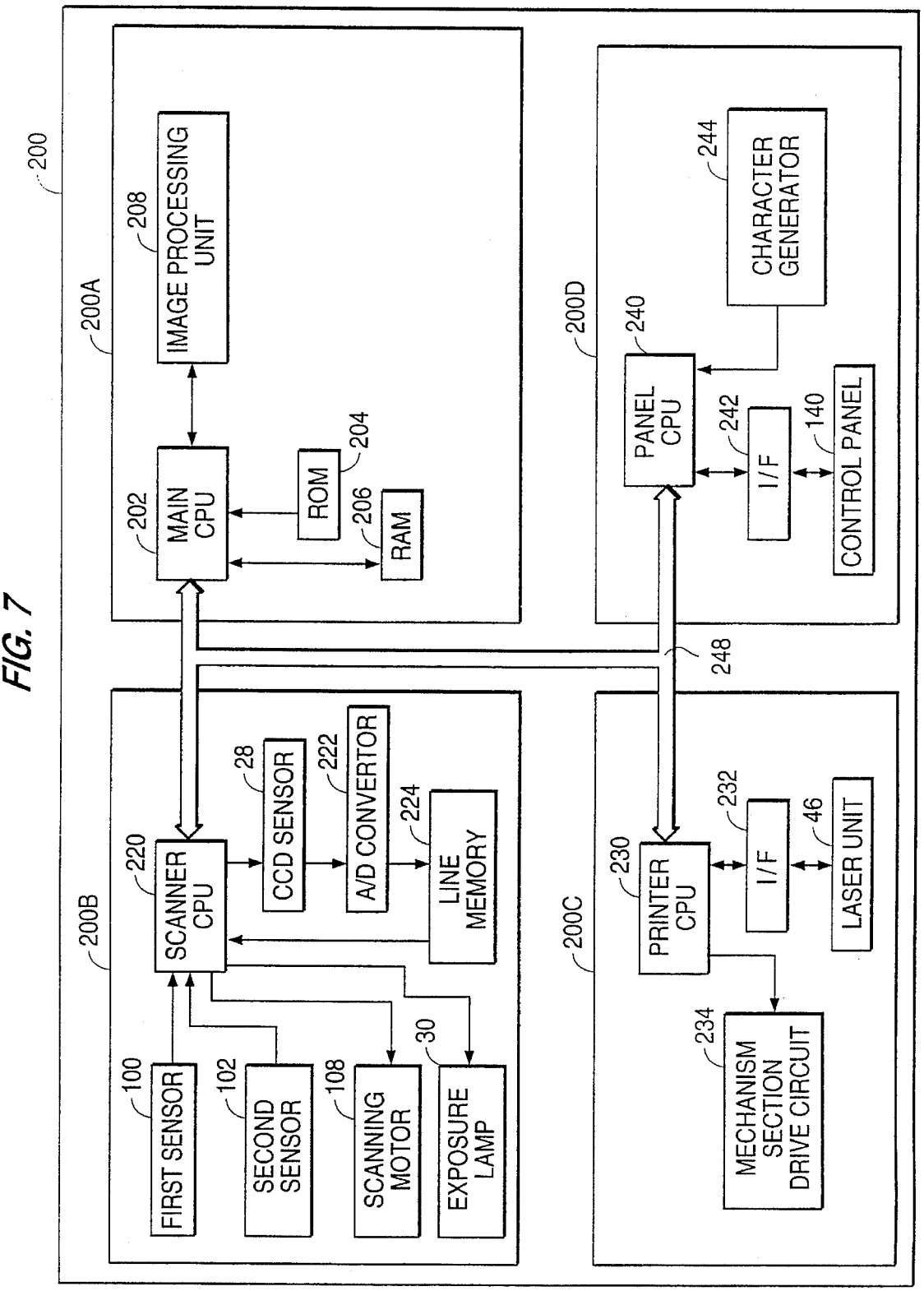
FIG. 7 is a diagram showing a control system of the copying machine shown 1

Referring to FIG. 7, control system 200 has a main control section 200A, a reading control section 200B for controlling image-reading system 20, an image-forming control section 200C for controlling image-forming unit 42, and an input control section 200D.

Main control section 200A includes a main CPU 202 which controls the entire control system 200. A ROM 204 stores a control program. CPU 202 operates in accordance with the control program in ROM 204. A RAM 206 is used as a page buffer for temporarily storing image data formed by image-reading section 20, and as a work buffer of main CPU 202. An image-processing unit 208 converts an image data to a print data on the basis of the copying condition, for example, a copy density, a magnification ratio, a setting of editing, the trimming mode, or a masking mode.

Reading control section 200B includes a scanner CPU 220 which controls reading control section 200B. CCD sensor 28, first sensor 100, second sensor 102, and scanning motor 108 are connected to scanner CPU 220. An A/D convertor 222 connects to the output portion of CCD sensor 28. A line memory 224 connects to scanner CPU 220 and A/D convertor R22. A/D convertor 222 outputs a digital image data corresponding to electric signals which CCD sensor 28 outputs. The digital image data output by A/D convertor 222 is temporarily stored in line memory 224 and is sent to RAM 206 through scanner CPU 220 and main CPU 202.

Image-forming control section 200C includes a print CPU 230 which controls image-forming unit 42. Laser unit 40 connects to printer CPU 230 through an interface circuit 232. The image data stored in RAM 206 is sent to printer CPU 230 through main CPU 202. Printer CPU 230 modulates laser beam LB in accordance with the image data when the semiconductor laser oscillator generates it. Printer CPU 230 connects to a mechanism section drive circuit 234 which is provided with drive circuits for driving various types of motors and solenoids in relationship with image-forming unit 42.

Input control section 200D includes a panel CPU 240 which controls control panel 140. Control panel 140 connects to panel CPU 240 through an interface circuit 242. Panel CPU 240 connects to a character generator 244 for generating data for characters which are displayed on display section 172. Main CPU 202, scanner CPU 220, printer CPU 230, and panel CPU 240 are connected to one another by a data bus 248.

According to the arrangement, copying operation is performed as follows.

Before the copying operation, an original D is placed on platen 6, and copying conditions are set by an operator using control panel 140. When copy key 142 is depressed in this condition, exposure lamp 30 radiates original D through platen 10. The light reflected from original D, which is exposed by exposure lamp 30, illuminates CCD sensor 28 via mirrors 32, 34, and 36, and lens block 26. At this time, first carriage 22 supporting exposure lamp 30 and second carriage 24 are moved a predetermined length corresponding to the original size in the direction of arrow RD by scanning motor 108.

CCD sensor 28 out puts electric signals corresponding to the light intensity. The output of CCD sensor 28 responds to each pixel which defines a resolution. The electric signals are converted to a signal containing digital data by A/D convertor 222. After that, the signals are subjected to shading correction in a shading correction circuit (not shown). A scatter between the elements of CCD sensor 28 and fluctuations in a threshold value originated by temperature changes are corrected by the shading correction. Then, the digital data is temporarily stored in line memory 224. Scanner CPU 220 stores the digital data as image data into RAM 206 via main CPU 202. The amount of the image data stored into RAM 206 is for one page. The image data corresponds to the resolution of CCD sensor 28, and each image datum corresponds to each pixel.

The image data stored in RAM 206 is read out by main CPU 202, and then image-processing unit 208 converts the image data to the print data on the basis of a copying condition set by an operator using control panel 140. Main CPU 202 outputs the print data to laser unit 46 via printer CPU 230. Each print datum corresponds to each pixel.

On the other hand, image-forming unit 42 rotates photosensitive drum 40 by a main motor (not shown) which is driven by mechanism section drive circuit 234. After the surface of photosensitive drum 40 is wholly charged by main charger 44, the charged surface is exposed by laser beam LB from laser unit 46. Laser beam LB, which laser unit 74 outputs, is based on print data from main CPU 202, and is made by a modulation circuit (not shown), laser driver (not shown), and the semiconductor laser oscillator. Then, laser beam LB is reflected by polygon mirror 50, which mirror motor 52 drives, and is supplied to the surface of photosensitive drum 40 as a line image. Thus, the electrostatic latent image is formed thereon. After that, the electrostatic latent image is developed into a toner image by developing unit 60. Transfer charger 76 transfers the toner image to paper sheet P which is transported to transfer region TR. Separation charger 78 separates paper sheets with the toner image from the surface of photosensitive drum 40. Next, paper sheet P with the toner image is transported to fixing unit 82. Finally, paper sheet P is discharged into tray 88.

Copying machine 2 is used as an image-scanning apparatus, a printing apparatus, and a facsimile apparatus, reciprocally or independently.

Figure 8A:
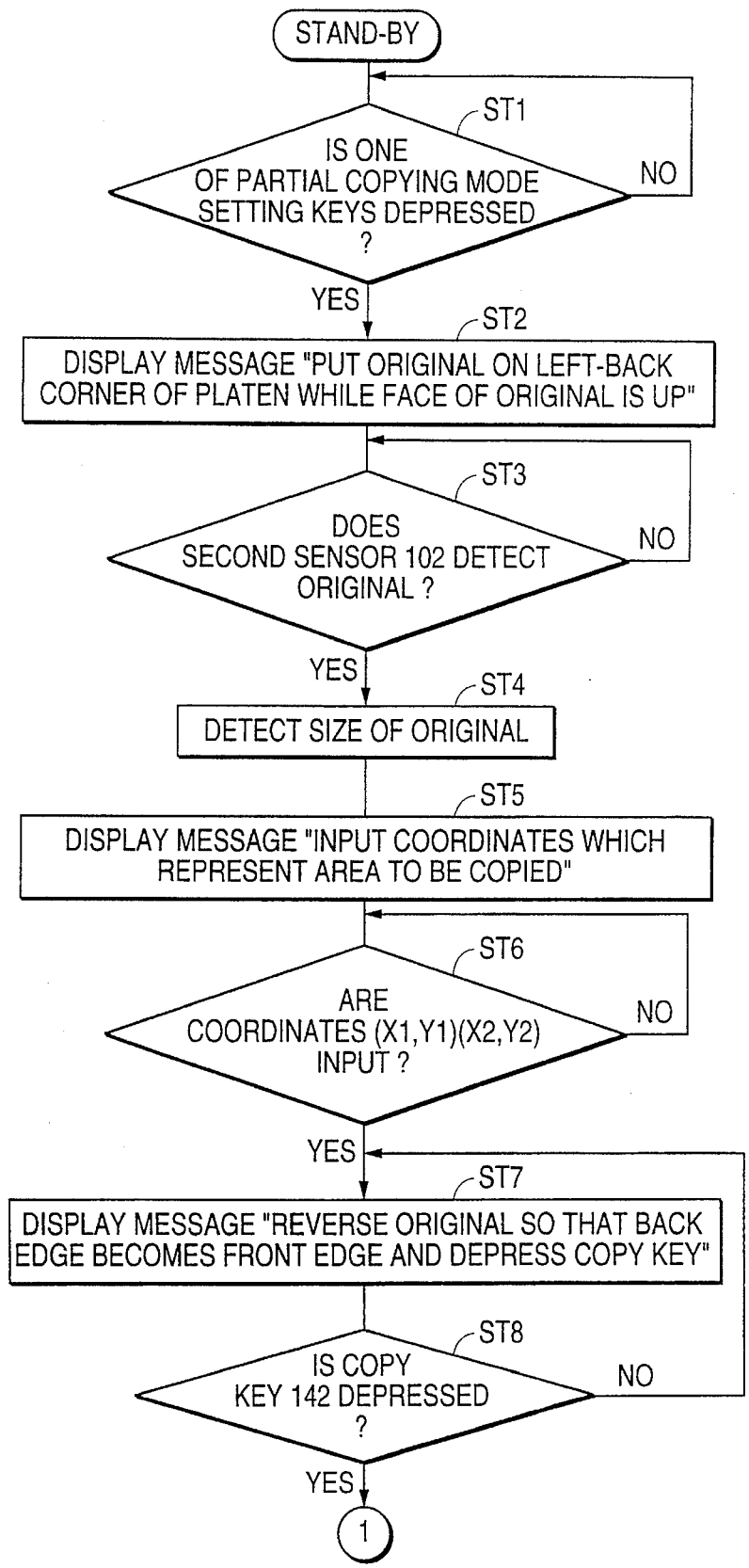
Figure 8B:
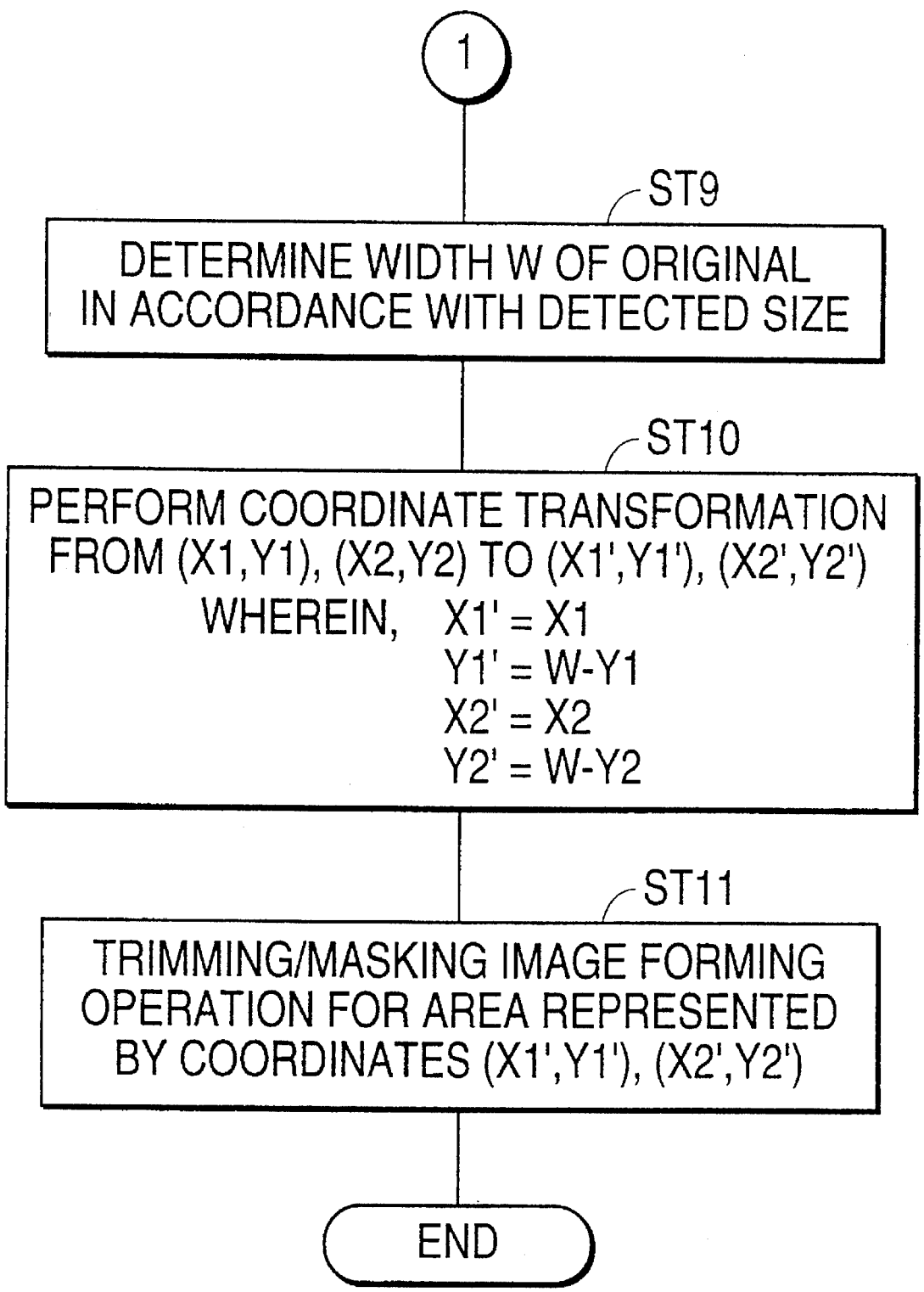

As for the partial copying mode, an operation of control system 200 will be described below with reference to flow charts shown in FIGS. 8(a) and 8(b).

When copying machine 2 is in the stand-by condition, if one of partial copying mode setting keys 174 and 176 is depressed, main CPU 202 makes display section 172 display a message "PUT ORIGINAL ON LEFT-BACK CORNER OF PLATEN WHILE FACE OF ORIGINAL IS UP" (steps ST1 and ST2). Then, main CPU 202 determines that second sensor 102 detects original D on platen 6, and main CPU 202 makes scanner CPU 220 to move first carriage 22 in the forward direction so as to detect the size of the original D (steps ST3 and ST4). Main CPU 202, scanner CPU 220, first sensor 100, second sensor 102, and scanning motor 108 then act as a means for detecting a length of the original. However, if an original size is set by an operator using original size key 164, the detecting operation will not be performed. In this case, main CPU 202, panel CPU 240, and original size key 164 acts as a means for detecting a length of the original. At that time, the original D must be placed on platen 6 as shown in FIG. 3(a).

After the original size has been detected, main CPU 202 makes display section 172 display a message "INPUT COORDINATES WHICH REPRESENT AREA TO BE COPIED" (step ST5). There are two coordinates "(X1, Y1)" and "(X2, Y2)" to be input by an operator using keys 144. When two coordinates are input on the basis of the marks on fixed scales 10 and 10A, main CPU 202 determines that the input area indicates a rectangular region having its two opposite vertexes which correspond to two coordinates, as shown in FIG. 3(a) (step ST6). Next, main CPU 202 makes display section 172 display a message "REVERSE ORIGINAL SO THAT BACK EDGE BECOMES FRONT EDGE AND DEPRESS COPY KEY" until copy key 142 is depressed (steps ST7 and ST8). Then the original D is rotated around an axis RA when an operator reverses the original D. When main CPU 202 determines that copy key 142 has been depressed, the original D must be placed on platen 6 so that the face of the original D is down, as shown in FIG. 3(b).

After step ST8 main CPU 202 determines the width W of the original D corresponding to the detected original size, in accordance with the table shown in FIG. 5 (step ST9). Next, main CPU 202 performs coordinate transformation from "(X1, Y1)" and "(X2, Y2)" to "(X1', Y1')" and "(X2', Y2')", wherein X1'=X1, Y1'=W−Y1, X2'=X2, and Y2'=W−Y2 (step. ST10). Main CPU 202 then acts as a means for performing coordinate transformation. The rectangular region corresponds to the image surface of the reversed original D, namely, the input coordinates and the transformed coordinates are symmetric with respect to axis RA, as shown in FIG. 3(b). Hence, main CPU 202 both transforms the coordinates, and does so in a symmetric manner. Alternatively, separate CPU's could be used for those individual functions.

Finally, main CPU 202 performs a trimming/masking image-forming opgration for the rectangular region represented by two coordinates "(X1', Y1')" and "(X2', Y2')" (step ST11). If a copying condition is changed by an operator using control panel 140 before copy key 142 is depressed at Step ST8, the trimming/masking image-forming operation is performed in accordance with the changed copying condition, for example, a copy density, a magnification ratio, and/or a setting of editing.

In the meantime, when the original size is input by an operator using original size key 164 after step ST4, main CPU 202 determines that the original size is the input one.

FIGS. 9(a), 9(b), 10(a) and 11 show a second embodiment of the operation of control system 200. In this embodiment, an original D is reversed in the partial copying mode by an operator so that the left-side edge becomes the right-side edge after two coordinates "(X1, Y1)" and "(X2, Y2)" have been input.

Figure 9A:
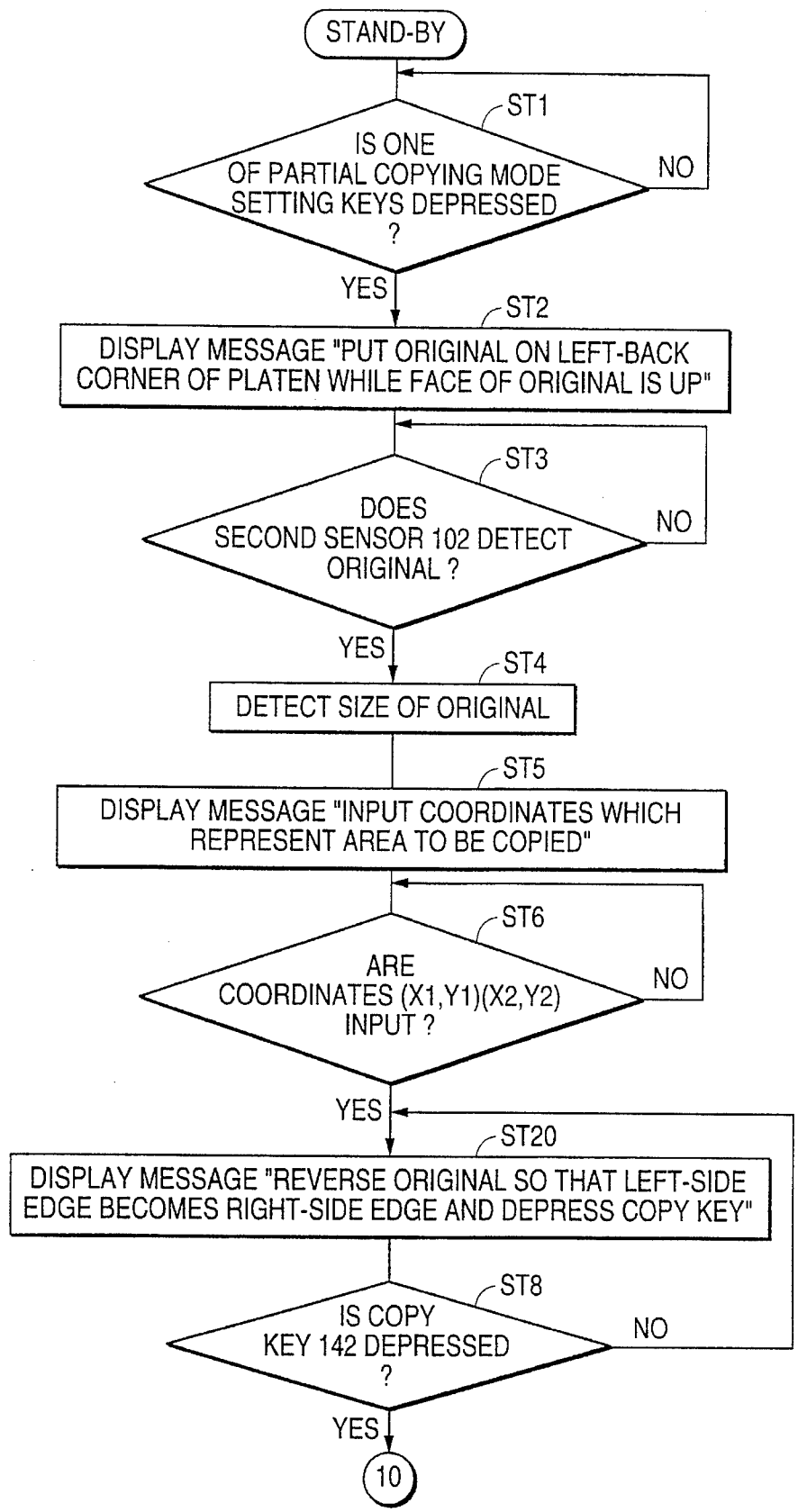
FIGS. 9(a) and 9(b) are flow charts for illustrating the operation of a second embodiment of the control system shown in FIG. 7.
Figure 9B:
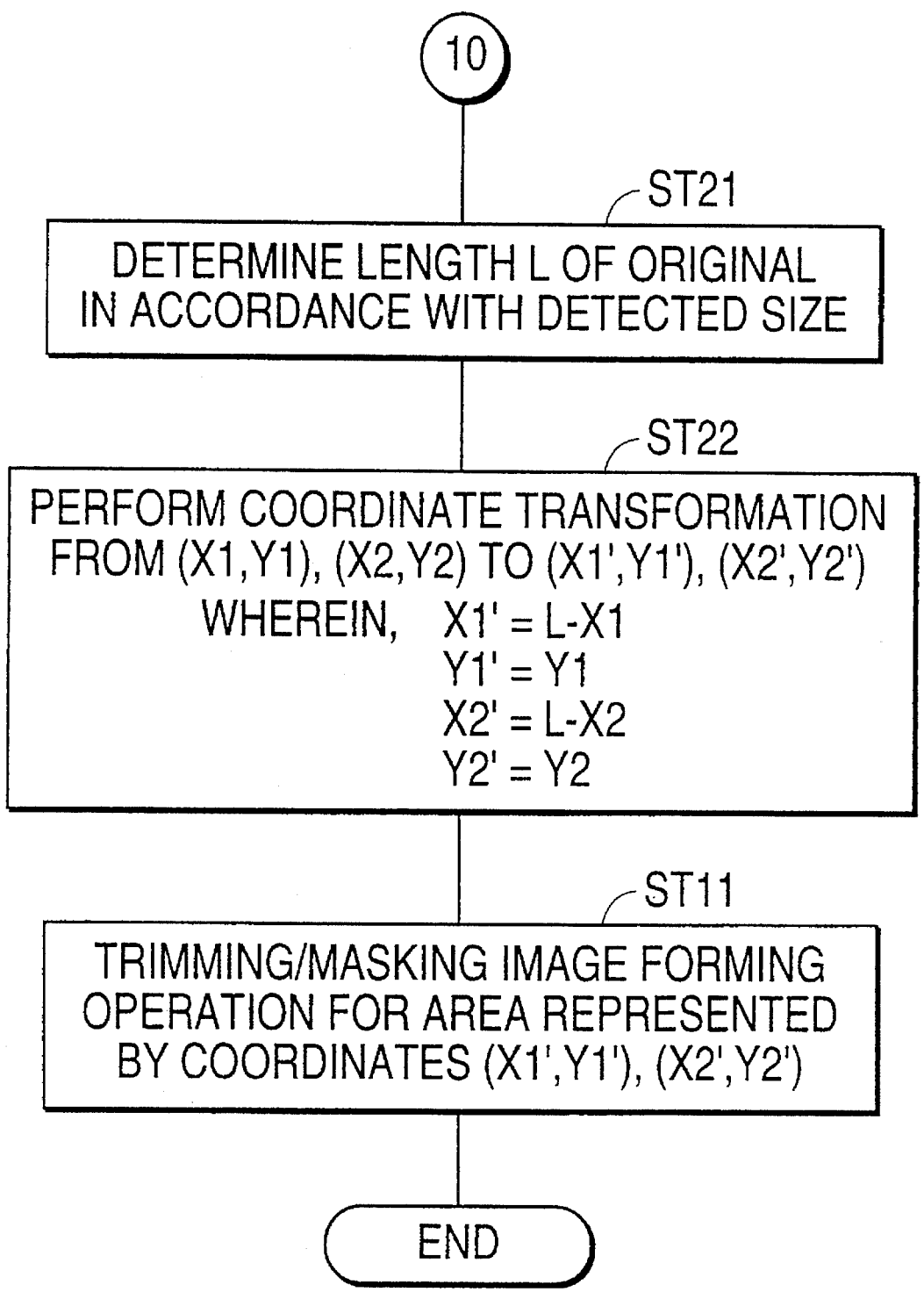
Figure 10A:
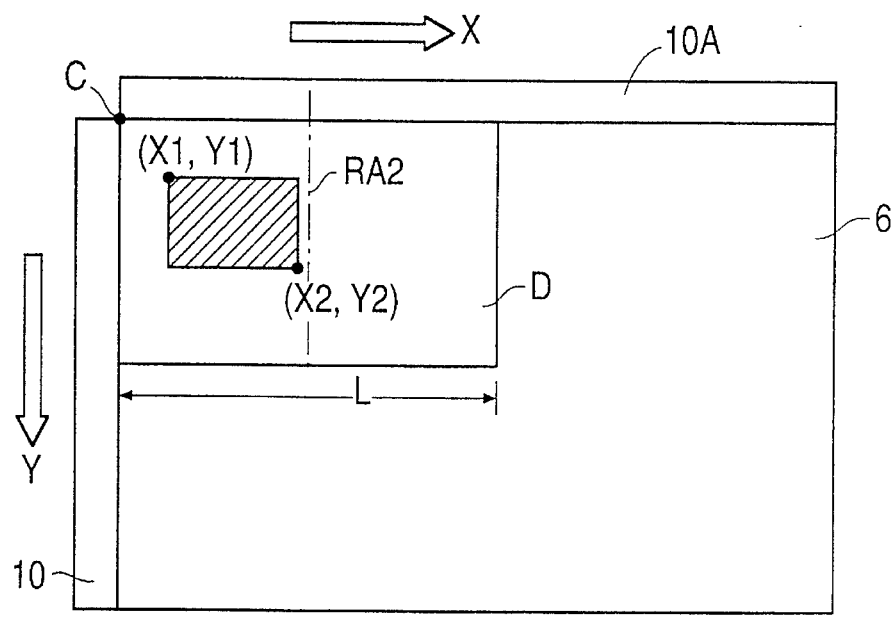
FIGS. 10(a) and 10(b) are plan views of a platen of the copying machine of the second embodiment for showing input coordinates which represent a desired image area, and showing how to reverse an original.
Figure 10B:
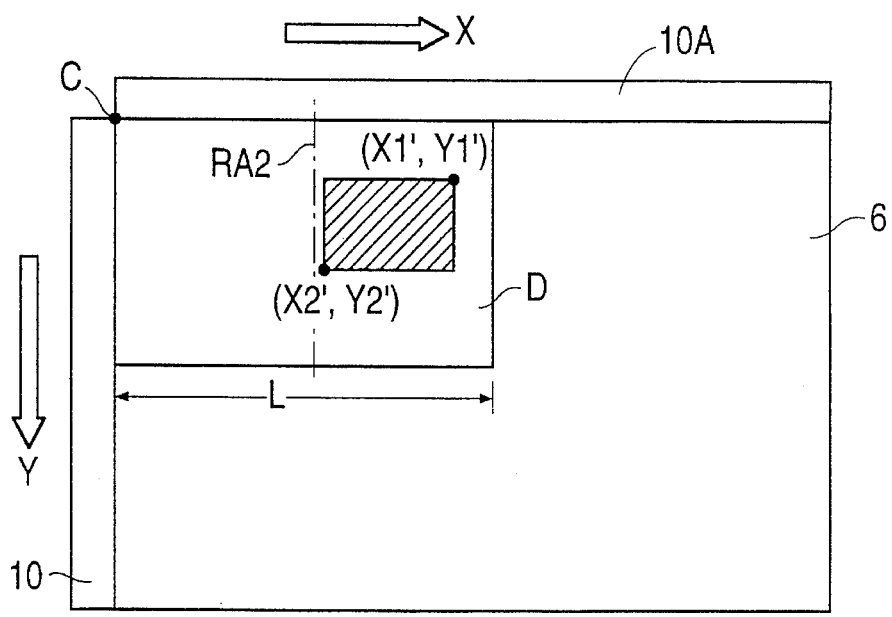

As shown in FIGS. 9(a) and 9(b), steps St1 to ST6 of this embodiment are the same as those of the first embodiment. After step ST6, main CPU 202 makes display section 172 display a message "REVERSE ORIGINAL SO THAT LEFT-SIDE EDGE BECOMES RIGHT-SIDE EDGE AND DEPRESS COPY KEY" until copy key 142 is depressed (step ST20 and ST8). Then, the original D is rotated around an axis PA2 when an operator reverses, the original D. When main CPU 202 determines that copy key 142 has been depressed, the placement of an original D as shown in FIG. 10(a) must be changed to that as shown in FIG. 10(b).

After step ST8, main CPU 202 determines a length L of the original D corresponding to the detected original size, in accordance With the table shown in FIG. 11 (step ST21). Next, main CPU 202 performs coordinate transformation from "(X1 Y1)" and "(X2, Y2)" to "(X1', Y1')" and "(X2', Y2')" wherein X1'=L−X1, Y1'=Y1, X2'=L−X2, and Y2'=Y2 (step ST22). The rectangular region corresponds to the image surface of the reversed original D, namely, the input coordinates and the transformed coordinates are symmetric with respect to axis RA2, as shown in FIG. 10(b). Finally, main CPU 202 performs a trimming/masking image-forming operation for the rectangular region represented by two coordinates "(X1', Y1')" and "(X2'Y2') (step ST11)

The present invention may be embodied in other specific forms without departing from the spirit or essential characteristics thereof. The presently described embodiments are therefore to be considered in all respects as illustrative and not restrictive. The scope of the present invention is indicated by the appended claims rather than by the foregoing description, and all changes which come within the meaning and range of equivalency of their claims are therefore intended to be embraced therein.

What is claimed is:

1. An image-forming apparatus for forming a image on an image-bearing member on the basis of an original image, comprising:

a platen on which an original having an original image is placed, the platen having a reference portion;

means for inputting coordinates representing a predetermined area of the original placed in a surface-up condition on the reference portion;

means for performing coordinate transformation from the coordinates to transformed coordinates, the transformed coordinates representing the predetermined area of the original placed in a surface-down condition;

means for informing an operator of a direction to rotate the original when the operator reverses the original from the surface-up condition to the surface-down condition;

an image-scanning unit, the image-scanning unit having an electric component which scans the original placed in the surface-down condition on the reference portion; and an image-forming unit, the image-forming unit having an electric component which forms an image on an image-bearing member on the basis of the original image which the image-scanning unit scanned, and which is limited to the predetermined area represented by the transformed coordinates.

2. An image-forming apparatus according to claim 1, wherein the performing means also transforms the coordinates to that the coordinates and the transformed coordinates are symmetric with respect to an axis around which the original is rotated when an operator reverses the original.

3. An image-forming apparatus according to claim 1, further comprising means for changing an image-forming condition for the original image which is represented by the transformed coordinates.

4. An image-forming apparatus according to claim 3, wherein the changing means includes means for modifying characters.

5. An image-forming apparatus according to claim 1, further comprising means for informing an operator of the reference portion.

6. An image-forming apparatus for forming an image on an image-bearing member on the basis of an original image, comprising:

a platen on which an original having an original image is placed, the platen having a reference portion;

means for inputting coordinates representing a predetermined area of the original placed in a surface-up condition on the reference portion;

means for performing coordinate transformation from the coordinates to transformed coordinates so that the coordinates and the transformed coordinates are symmetric with respect to an axis around which the original is rotated in a rotational direction when an operator reverses the original, the transformed coordinates representing the predetermined area of the original placed in a surface-down condition, an image-scanning unit, the image-scanning unit having an electric component which scans the original placed in the surface-down condition on the reference portion; and an image-forming unit, the image-forming unit having an electric component which forms an image on an image-bearing member on the basis of the original image which the image-scanning unit scanned, and which is limited to the predetermined area represented by the transformed coordinates;

wherein the performing means includes means for detecting a length of the original in the rotational direction.

7. An image-forming apparatus according to claim 6, wherein the inputting means includes keys for inputting a number which represents coordinates in the partial image-forming mode.

8. An image-forming apparatus according to claim 6, further comprising means for displaying a message which tells how to reverse the original after the coordinates have been input and before the image-forming unit starts to form the image so that an operator reverses the original properly.

9. An image-forming apparatus according to claim 6, wherein the detecting means includes means for inputting a size of the original.

10. An image-forming apparatus for forming an image on an image-bearing member on the basis of an original image, comprising:

a platen on which an original is placed, the platen having a reference portion;

a first fixing shale arranged along a first edge of the platen, the first fixing scale being marked out in equal increments and positioning an original at the reference portion;

a second fixing scale arranged along a second edge of the platen, the first edge and the second edge forming a corner of substantially a right angle, the second fixing scale being marked out in equal increments and positioning an original at the reference portion;

means for setting a partial image-forming mode;

means for inputting coordinates representing a predetermined area of the original which is placed on the reference portion and whose image surface is up, in the partial image-forming mode, the coordinates being on the basis of the marks of the first fixing scale and the second fixing scale;

means for displaying a message which tells how to reverse the original after the coordinates have been input so that an operator reverses the original properly;

means for performing coordinate transformation from the coordinates to transformed coordinates, the coordinates and the transformed coordinates being symmetric with respect to an axis around which the original is rotated when an operator reverses the original;

a key which an operator operates to start an image-forming operation;

means for scanning an original image on the reference portion when the key is operated; and means for forming an image on an image-bearing member on the basis of the original image which the image-scanning unit scanned, and which is limited to the predetermined area represented by the transformed coordinates.

11. An image-forming method comprising the steps of:

inputting coordinates representing a predetermined area of an original placed in a surface-up condition on an image-scanning portion;

detecting a size of the original;

performing coordinate transformation from the coordinates to transformed Coordinates on the basis of the size of the original, the transformed coordinates representing the predetermined area of the original placed in a surface-down condition;

scanning the original placed in the surface-down condition on the image-scanning portion; and forming an image ion an image-bearing member on the basis of the original image which is scanned, and which is limited to the predetermined area represented by the transformed coordinates.

12. An image-forming apparatus for forming an image on an image-bearing member on the basis of an original image, comprising:

a platen on which an original having an original image is placed, the platen having a reference portion, means for determining a length of the original in a rotational direction;

means for inputting coordinates representing a predetermined area of the original placed in a surface-up condition on the reference portion;

means for performing co ordinate transformation from the coordinates to transformed coordinates on the basis of the length of the original, the transformed coordinates representing the predetermined area of the original placed in a surface-down condition;

means for scanning the original placed in the surface-down condition on the reference portion after the original is reversed in the rotational direction; and means for forming an image on an image-bearing member on the basis of the original image which the scanning means scanned, and which is limited to the predetermined area represented by the transformed coordinates.

13. An image-forming method, comprising the steps of:

inputting coordinates representing a predetermined area of an original placed in a surface-up condition on an image-scanning portion;

performing coordinate transformation from the coordinates to transformed coordinates, the transformed coordinates representing the predetermined area of the original placed in a surface-down condition;

informing an operator of a direction to rotate the original when the operator reverses the original from the surface-up condition to the surface-down condition;

scanning the original placed in the surface-down condition on the image-scanning portion; and forming an image on an image-bearing member on the basis of the original image which is scanned, and which is limited to the predetermined area represented by the transformed coordinates.

\* \* \* \* \*